United States Patent [19]

Beattie

[11] Patent Number: 5,425,287
[45] Date of Patent: Jun. 20, 1995

[54] SYSTEM FOR DAMPING VIBRATION OF CRANKSHAFTS AND THE LIKE

[76] Inventor: James C. Beattie, 6747 Whitestone Rd., Baltimore, Md. 21207

[21] Appl. No.: 122,509

[22] Filed: Nov. 18, 1987

Related U.S. Application Data

[63] Continuation of Ser. No. 901,838, Aug. 29, 1986, abandoned.

[51] Int. Cl.6 .............................................. F16F 15/10
[52] U.S. Cl. ............................... 74/574; 74/573 F; 74/572
[58] Field of Search ..................... 74/574, 572, 573 R

[56] References Cited

U.S. PATENT DOCUMENTS

| | | | |
|---|---|---|---|
| 2,473,335 | 6/1949 | Hardy | 74/574 |
| 2,714,823 | 8/1955 | Dall et al. | 74/574 |
| 2,722,138 | 11/1955 | Neher | 74/574 |
| 2,779,211 | 1/1957 | Henrich | 74/574 |
| 2,824,467 | 2/1958 | O'Connor | 74/574 |
| 2,834,225 | 5/1958 | Carter et al. | 74/574 |
| 3,058,321 | 10/1962 | Aske | 74/574 |
| 3,088,332 | 5/1963 | Arnt | 74/574 |
| 3,105,392 | 10/1963 | Rumsey | 74/574 |
| 3,108,490 | 10/1963 | Turlay | 74/574 |
| 3,196,710 | 7/1965 | Peirce | 74/574 |
| 3,262,334 | 7/1966 | Edwards | 74/574 |
| 3,264,898 | 8/1966 | O'Connor | 74/574 |
| 3,280,654 | 10/1966 | Arnt | 74/574 |
| 3,334,886 | 8/1967 | Caunt | 74/574 |
| 3,373,633 | 3/1968 | Desmond et al. | 74/574 |
| 3,385,082 | 5/1968 | Deuring et al. | 74/574 |
| 3,495,459 | 2/1970 | McLean | 74/574 |
| 3,495,475 | 2/1970 | Rumsey | 74/574 |
| 3,552,230 | 1/1971 | McLean | 74/574 |
| 3,603,172 | 9/1971 | Hall | 74/574 |
| 3,640,149 | 2/1972 | McLean | 74/574 |
| 3,641,839 | 2/1972 | Greeley | 74/574 |
| 3,670,593 | 6/1972 | Troyer | 74/574 |
| 3,771,380 | 11/1973 | Bahr et al. | 74/574 |
| 3,955,400 | 5/1976 | Parker | 74/574 |
| 3,986,411 | 10/1976 | Kirby | 74/574 |
| 4,044,627 | 8/1977 | Zander | 74/574 |
| 4,150,587 | 4/1979 | Bremer | 74/574 |
| 4,207,957 | 6/1980 | Sivers et al. | 74/574 |
| 4,254,985 | 3/1981 | Kirschner | 74/574 |
| 4,262,553 | 4/1981 | Bremer | 74/574 |
| 4,432,254 | 2/1984 | Schultz | 74/574 |
| 4,434,382 | 2/1984 | Patel et al. | 74/574 |
| 4,563,605 | 1/1986 | Gerber | 74/574 |

FOREIGN PATENT DOCUMENTS

| | | | |
|---|---|---|---|
| 2497314 | 7/1982 | France | 74/574 |
| 736808 | 9/1955 | United Kingdom | 74/574 |

OTHER PUBLICATIONS

Published by: Society of Automotive Engineers, Inc., "A Practical Tratise on Engine Crankshaft Torsional Vibration Control", Jun. 1979, pp. 1–38.

Primary Examiner—Vinh T. Luong
Attorney, Agent, or Firm—Cushman, Darby & Cushman

[57] ABSTRACT

A damping system for motor vehicle axial drives and the like, provides a dismountable mounting on a hub and substantially enclosing a square-section inertia ring grooved around all faces, and having respective "O"-rings movably and removably held between the grooves and the housing by compressive contact, providing for ready replacement of the "O"-rings.

7 Claims, 2 Drawing Sheets

SYSTEM FOR DAMPING VIBRATION OF CRANKSHAFTS AND THE LIKE

FIELD OF THE INVENTION

This is a continuation of application Ser. No. 901,838, filed Aug. 29, 1986 now abandoned.

This invention relates generally to damping of mechanisms and specifically to a system for damping of vibration of crankshafts and the like.

BACKGROUND OF THE INVENTION

In the known art are various damping devices as disclosed in the following U.S. Pat. Nos.:

2,714,823 issued to A. H. Dall and R. R. Adams on Aug. 9, 1955, showed a frictional vibration damper with an inertia ring with coprene in recesses in the faces and operating under spring bias in a coaxial chamber with a coprene lining.

2,722,138 issued to E. P. Neher on Nov. 1, 1955, showed use of an "O" ring stretched around a perimeter of an inertial ring between it and peripheral flange of a wheel. An adhesive bond was described as unnecessary.

3,264,898 issued to B. E. O'Connor on Aug. 9, 1966, showed a pair of ring-shaped flexible friction pads of Teflon between an inertia ring and a casing; fluid damping was described.

3,334,886 issued to A. Caunt on Aug. 8, 1967, showed a torsional damper using rubber strips.

However, in the known art no disclosure appears of a damping system with the improvements set forth herein as objects of this invention.

In all internal combustion engines and many mechanical devices, torsional energy is applied to a shaft to transfer energy to the point at which it is used. The torsional energy on the shaft results in a residual twisting of a shaft as it returns to its natural state. These twisting forces create undesirable vibrations or harmonics that will destroy the shaft and related components if permitted to remain in the assembly.

The most commonly used torsional dampers are of the elastomer type. In these dampers a hub is pressed to the shaft, and on the outer diameter of the hub an inertia ring is attached using a bonding or mechanical press process to secure the inertia ring to the hub with a rubber insulation. The rubber insulation allows the inertia ring to move independent of the hub that is pressed on the shaft, the independent movement of the inertia ring dampening torsional vibrations.

Movement of the inertia ring is governed by the stretch of the elastomer used.

These dampers are used exclusively by nearly all major automotive manufacturers as OEM and replacement parts. The bonded or mechanically pressed elastomer securing the inertia ring to the shaft hub deteriorates with age, causing undesirable events to occur:

1. When a mark is applied to the inertia ring and indexed to the hub that is positioned to the shaft, movement of the ring will cause erroneous timing of the assembly during adjustments.
2. These assemblies are generally balanced to 0.25 in. ounces by removing material from the ring after the ring is secured to the hub. Changes in the ring position relative to the hub cause imbalance of the assembly.
3. In severe cases of elastomer and bonding deterioration, the inertia ring can depart from the hub, creating a hazardous rotating missile.
4. Since the bonding or mechanically pressed process of the elastomer require specialized equipment, those assemblies are not field repairable.

SUMMARY OF THE INVENTION

A principal object of this invention is to provide a damping system that eliminates these undesirable features by:

1. Replacing the bonded or pressed elastomer with "O" rings, installed between the hub and the inertia ring in a frictional, compressional fit.
2. Fully retaining the inertia ring to the hub with front and retainer plates.
3. Eliminating timing errors by removing the timing reference mark from the inertia ring and applying the mark to a plate or shell that is secured to the hub.
4. Enhancing the ability of the damper to dissipate vibrations by increasing elastomeric material in the outer shell of a damper.
5. Rendering the assembly field-rebuildable by simple replacement of the elastomer.
6. Providing multiple frequency as noted further herein.

A further object is to provide a dismountable mounting, also termed housing, on a hub and substantially enclosing a square-section inertia ring grooved around all faces, and having respective elastomer "O" rings movably and removably held between the grooves and the housing by compressive contact, providing for ready replacement of the elastomer. Another object of this invention is to provide a housing attached to the hub which surrounds said inertia ring to prevent the inertia ring from moving along the hub.

Another object of this invention is to provide an elastomeric element disposed between an inner annular surface of the inertia ring and the hub and an elastomeric element disposed between an outer annular surface of the inertia ring and the housing. These elastomeric elements frictionally engage both elements between which it is disposed so that all torque applied to the inertia ring is applied through the elastomeric elements. This provides a damper which can easily provide dampening at various frequencies. Yet further objects and advantages will be seen at the end of the following description.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION OF THE INVENTION

Figure 1:
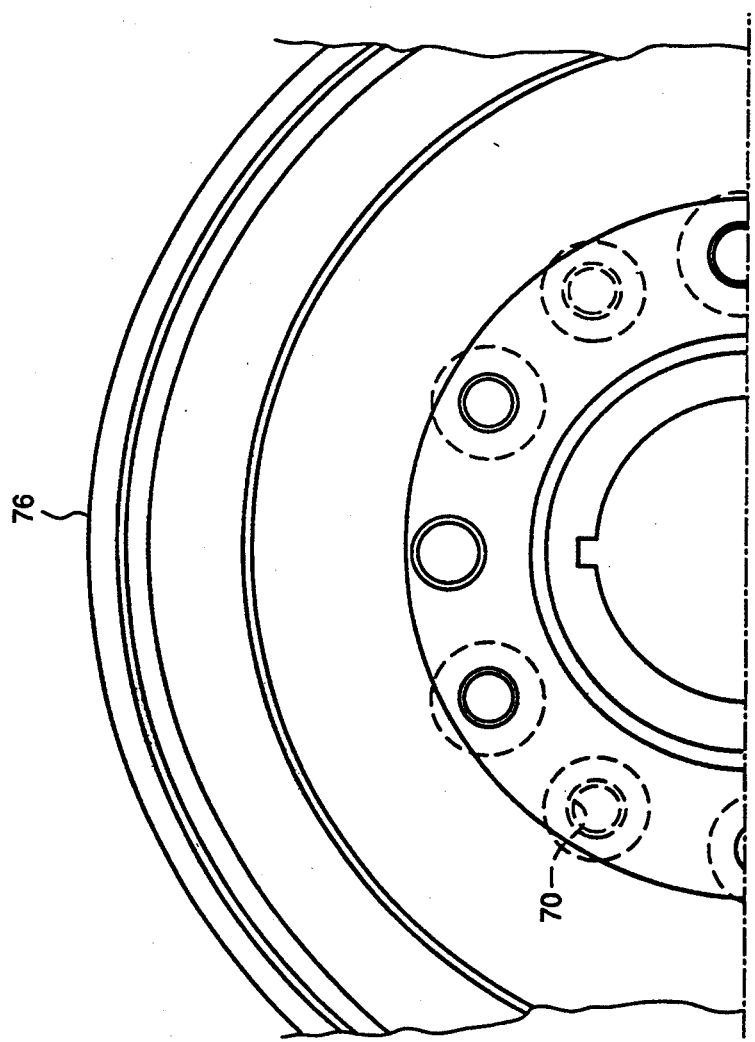
FIG. 1 is a longitudinal sectional detail showing a representative portion of a preferred embodiment disposed about a drive axis.

FIG. 1 shows embodiment 10, a shaft mounted hub 209 to which are held by machine screws 22 shown fits into a center hole of the inertia ring 32, a unitary mounting or housing 24 made of two annular ring members 26 and 28, forming a chamber 30 within which a grooved inertia ring 32 is resiliently held by resilient "O"-rings 34, 36, 38, 40, 42, 44, 46, 48. Hereinafter, including the claims, hub 20 and housing 24 will be collectively referred to as a housing assembly.

The "O" rings are movably and removably held in that they are compressed between the corresponding groove structure 50, 52, 54, 56, for example, and the chamber walls without bonding or other such attachment.

When wear or damage or deterioration makes "O"-ring replacement necessary, only a few minutes will be required for removal of the screws, easy disassembly, and installation of new "O"-rings, followed by easy re-assembly.

The inertia ring 32 has in sectional view preferably a substantially rectangular shape.

Three "O"-rings are provided in the areas of greatest load, the outer and inner annular surfaces of the inertia ring 32, and the corresponding, equally spaced, grooves for these are half-round in sectional view and fit the "O"-rings closely.

Only one "O"-ring is provided for each of the first and second axial faces 62, 64 of the inertia ring and these "O"-rings are held in respective rectangular-section grooves 54, 56.

Protrusions of the "O"-rings from the grooves may be greatest at the outer and inner circumferences, and should be sufficient to compress the "O"-rings substantially enough to prevent metal-to-metal contact of the inertia ring with this mounting, under load. It can be seen that the inertia ring is entirely supported at all times by the "O"-rings.

Figure 2:
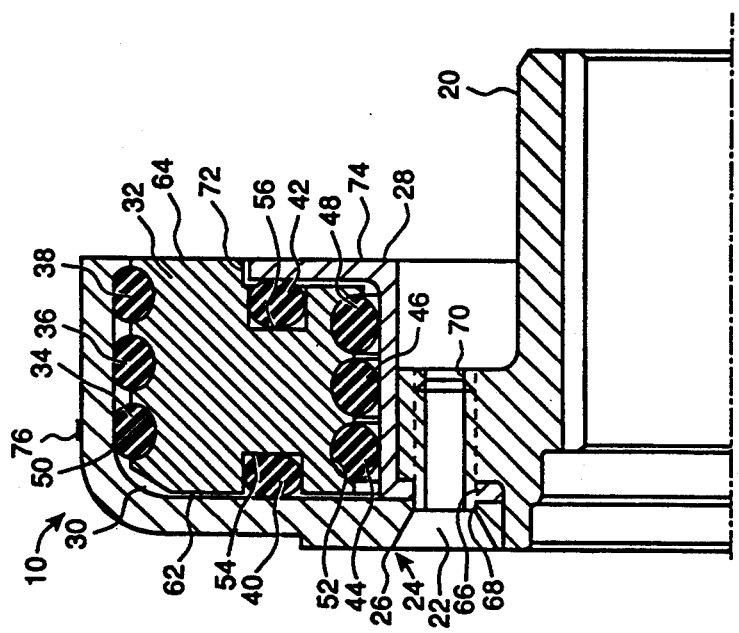
FIG. 2 is a fragmentary axial-view detail showing a representative portion of the same embodiment.

FIG. 2 shows a fragmentary axial view of assembly portions ready for installation of the screws.

General details of the components as shown in the figures include the sectional view shapes of the first and second parts 26, 28 of the mounting 24. Each has a circular series of holes (66, 68, FIG. 1) in alignment with each other and with respective attachment holes 70 in the hub. Additional holes are provided as indicated to facilitate mounting of pulleys or other members to be driven by the shaft to which hub 20 is attached.

The first part 26 of the mounting is in sectional view generally "L"-shaped with a portion of the "L" shape extending radially outward parallel with the first axial face 62 of the inertia ring and then from the apex of the "L"-shape extending across the outer circumference of the inertia ring as a safety shield. Preferably, for clearance under load, the apex of the "L"-shape is rounded, adjacent 30. The mounting 26 further includes provision whereby in similar longitudinal sectional view the second part 28, another annular member, extends in the shape of a right-angled "Z", first radially outward, then across the inner circumference of the inertia ring, and then extends radially outward across a portion of the inertia ring second axial face 64.

The first and second parts of the mounting 24 thereby substantially enclose the inertia ring.

Preferably the inertia ring second axial face 64 has a recess 72 receiving a portion 74 of the second part of the mounting therein.

It will be appreciated that the axial face and the radial face grooves may be rectangular or rounded in cross-section.

As indicated, preferably all "O"-rings have the same cross-sectional diameter. However, "O" rings of different cross-sectional dimensions, "Durometer" (TM) hardness and composition can be used to tune the assembly to certain vibration ranges or frequencies. Further, although the embodiment shown provides three, three, one and one "O"-rings in use, more or as few as one of each face could be used in particular applications.

The annular ring 26 and the annular ring 28 and the hub 20 can be manufactured as one part without screw 22 if the rear flange of annular ring 28 is attached after insertion of the inertia ring 32.

The rear retaining flange at 28 may be extended to "O"-ring 38 to provide space for more "O"-rings on the axial faces.

The "O"-rings can be bonded if desired but such is not necessary.

"V"-groove gear teeth or belt cogs for an accessory drive can be machined into the outer diameter of 26 at 76 to drive additional members as required.

One or more timing indicia 76 may be placed on the mounting 24 where, in this invention, the flexing of the elastomeric parts will not affect the timing adjustment of an engine on which the invention is installed.

The driven hub 20 and the annular ring member 28 can be one part, if desired. The annular ring rear flange that retains the inertia ring 32 could be a separate part held by a snap ring or screws or welded in place.

Figure 3:
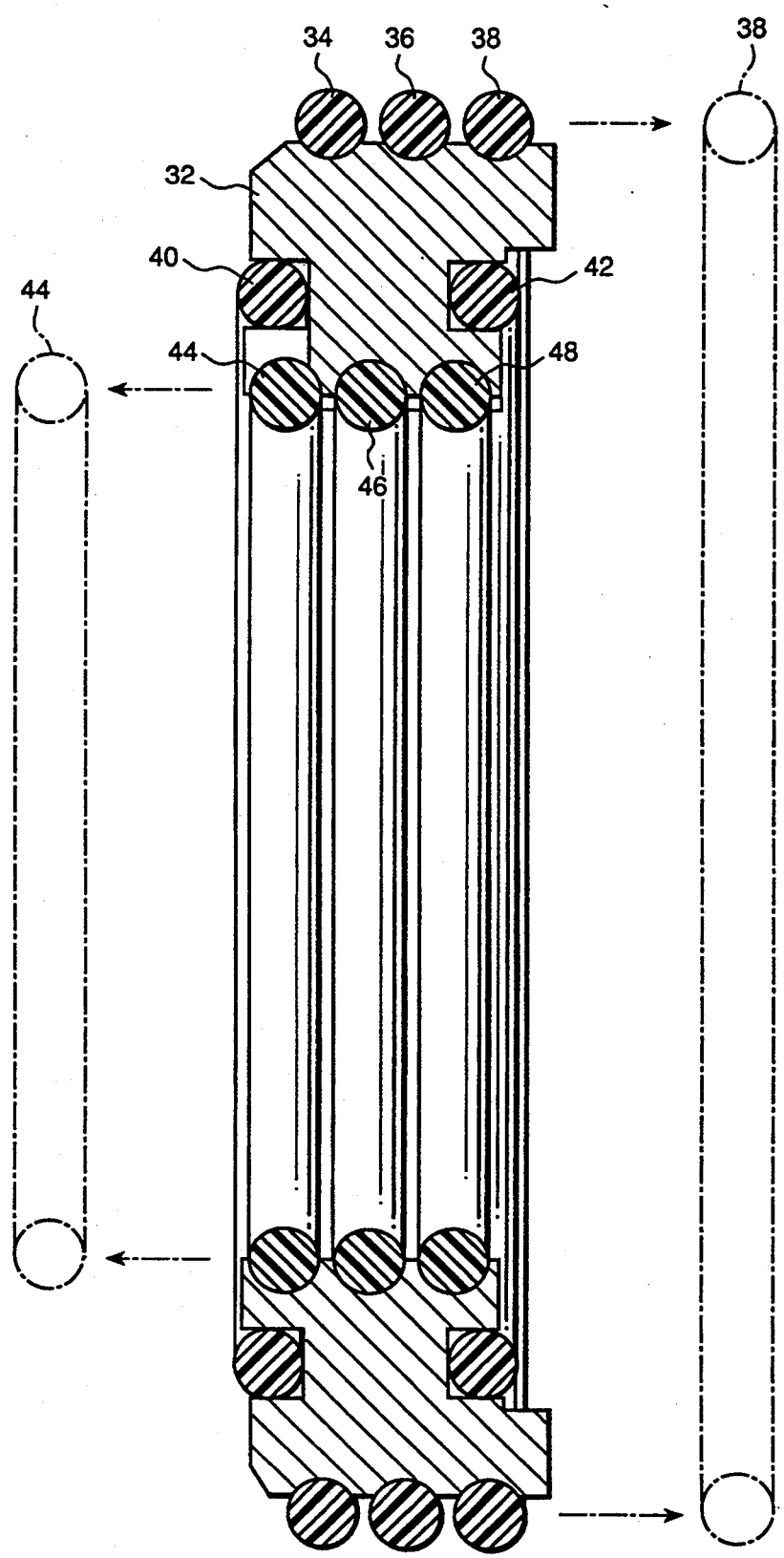
FIG. 3 is a sectional view of the inertia ring showing removable O-rings.

Also, the "O"-rings as shown in FIG. 3 are removable.

In summary, it will be appreciated that the invention provides new safety, efficiency and ease of maintenance in the art of engine dumping.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed is:

1. An elastomeric torsional vibration damper comprising:
   an inertia ring having a center hole which defines an inner annular surface and an outer annular surface in the radial direction and first and second axial faces;
   a housing assembly disposed at least partly in said center hole and which covers said inertia ring to prevent said inertia ring from moving out of said housing assembly;
   a first elastomeric element disposed between said inner annular surface of said inertia ring and said housing assembly to frictionally engage both said inertia ring and said housing assembly; and
   a second elastomeric element disposed between said outer annular surface of said inertia ring and said housing assembly to frictionally engage both said inertia ring and said housing assembly,
   third and fourth elastomeric elements disposed on said first and second axial faces of said inertia ring, respectively, all torque applied to said inertia ring being applied only through said first, second, third and fourth elastomeric elements.

2. An elastomeric torsional vibration damper comprising:
   an inertia ring having a center hole which defines an inner annular surface and an outer annular surface in the radial direction, first and second axial faces and further including at least one groove in each of said inner annular surface, said outer annular surface and said first and second axial faces;
a housing assembly disposed at least partially in said center hole and which substantially covers said inertia ring; and
an elastomeric O-ring freely disposed in each of said grooves of said inertia ring, said O-rings frictionally engaging both said inertia ring and said housing assembly and all torque applied to said inertia ring only through said O-rings.

3. An elastomeric torsional vibration damper of claim 2 which further includes a timing indicium on said housing assembly.

4. An elastomeric torsional vibration damper of claim 2 wherein each of said elastomeric O-rings is removable.

5. An elastomeric torsional vibration damper of claim 2 wherein each of said O-rings has a different hardness.

6. An elastomeric torsional vibration damper comprising:

an inertia ring having a center hole which defines an inner annular surface and an outer annular surface in the radial direction, first and second axial faces and further including a plurality of grooves in each of said inner annular surface and said outer annular surface and at least one groove in each of said first and second axial faces;
a housing assembly disposed at least partially in said center hole and which substantially covers said inertia ring; and
an elastomeric O-ring freely disposed in each of said grooves of said inertia ring, said O-rings frictionally engaging both said inertia ring and said housing assembly and all torque applied to said inertia ring only through said O-rings.

7. An elastomeric torsional vibration damper of claim 6 wherein said plurality of grooves, when viewed in longitudinal sectional view, are half round grooves fitting the O-ring disposed therein.

* * * * *